US008743119B2

(12) United States Patent (10) Patent No.: US 8,743,119 B2
Shiell et al. (45) Date of Patent: Jun. 3, 2014

(54) MODEL-BASED FACE IMAGE SUPER-RESOLUTION

(75) Inventors: Derek Shiell, Los Angeles, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 394 days.

(21) Appl. No.: 13/114,514

(22) Filed: May 24, 2011

(65) Prior Publication Data

US 2012/0299906 A1 Nov. 29, 2012

(51) Int. Cl.
  *G06T 17/00* (2006.01)
(52) U.S. Cl.
  USPC ......................................................... 345/428
(58) Field of Classification Search
  USPC ......................................................... 345/428
  See application file for complete search history.

(56) References Cited

U.S. PATENT DOCUMENTS

| 6,023,535 | A | * | 2/2000 | Aoki | 382/299 |
| 6,044,168 | A | * | 3/2000 | Tuceryan et al. | 382/118 |
| 8,233,734 | B2 | * | 7/2012 | Zhang et al. | 382/254 |
| 2002/0113799 | A1 | * | 8/2002 | Brand | 345/582 |
| 2007/0103595 | A1 | * | 5/2007 | Gong et al. | 348/620 |
| 2011/0305404 | A1 | * | 12/2011 | Lin et al. | 382/275 |

OTHER PUBLICATIONS

Baker, S., et al., "Limits on Super-Resolution and How to Break Them", IEEE Transactions on Pattern Analysis and Machine Intelligence, vol. 24, No. 9, pp. 1167-1183, Sep. 2002.*
Freeman, W., et al., "Example-Based Super-Resolution", Image-Based Modeling, Rendering and Lighting, IEEE Computer Graphics and Applications, Mar./Apr. 2002.
Jia, K., et al., "Multi-Modal Tensor Face for Simultaneous Super-Resolution and Recognition", Proceedings of the Tenth IEEE International Conference on Computer Vision, 2005.
Liu,C., et al., "A Two-Step Approach to Hallucinating Faces: Global Parametric Model and Local Nonparametric Model", IEEE, 2001.
Jia, K., et al., Coupling Face Registration and Super-Resolution, Proceedings of the British Machine Vision, 2006.

* cited by examiner

*Primary Examiner* — Xiao Wu
*Assistant Examiner* — Hoai Le

(57) ABSTRACT

An output image of higher resolution than an input image is constructed by using a low resolution (LR) dictionary of triangle data entries, each having a one-to-one correlation with a high resolution (HR) data entry in an HR dictionary of triangle data entries. The input image is triangularized, and the closest matching LR data entry in the LR dictionary for each triangle in the triangularized input image is identified. The HR data entry correlated to each identified matching LR data entry is then used to construct the output image by wrapping the correlated HR data entry onto the corresponding triangle on the triangularized input image.

20 Claims, 12 Drawing Sheets

All HR images and LR image are warped onto the Model Triangularized Face

Model Triangularized Face

MODEL-BASED FACE IMAGE SUPER-RESOLUTION

BACKGROUND

1. Field of Invention

The present invention relates broadly to the field of super resolution. More specifically, it relates to the creation of an output image of higher resolution than an input image using an object model.

2. Description of Related Art

In the field of image processing, it is often desirable to reconstruct a face from a captured image. Preferably, one would desire a high resolution construct of the face, but typically, the captured images come from low resolution sources and/or images where the desired subject's face occupies a small part of the entire image. Basically, a captured image of a desired subject is often a low resolution image, so even if one were to identify and extract the desired subject, the extracted face would be small and/or low resolution. Increasing the size of the image would merely increase the distortion and thus not result in a high resolution rendition.

There is therefore a growing interest in the field of constructing a high resolution images from low resolution images. These types of constructions are typically referred to as super resolution images. This naturally entails adding information not found in the originally captured image. Consequently, one typically needs to know the class of subject one intends to reconstruct in order to have an idea of what type of new information would likely be added. For example, in any given approach, one would need to know the class of object (i.e., a human face, a specific human organ, etc.) whose resolution one intended to increase.

Various approaches have been proposed to achieve this aim, and many of these proposals take a statistical approach. For example, in "A Two-Step Approach to Hallucinating Faces: Global Parametric Model and Local Nonparametric Model" by Liu et al. (State Key Lab of Intelligent Technology and Systems, Dept. of Automation and Visual Computing Group, Microsoft Research China, ISBN 0-7695-1272-0/01, 2001, IEEE), a method for constructing a high resolution face from a low resolution face implements a two step approach utilizing a global linear model relating high-resolution faces to low resolution faces followed by a patch-based markov network. The super-resolution face is created by finding the maximum aposteriori solution of the statistical framework.

Another example is found in "Example-Based Super-Resolution" by Freeman et al., IEEE Computer Graphics and Applications, March/April 2002. Freeman et al. construct low and high resolution dictionaries from sample images, but the dictionaries are not specialized to any specific part of a face.

Another approach is described in "Coupling Face Registration and Super-Resolution" by Jia et al, Department of Computer Science Queen Mary, University of London, London, E1 4NS, UK, 2006. Jia et al propose a multi-resolution tensor model-based approach to super-resolution, and integrate the super-resolution estimation with face registration/alignment.

Still another approach is described in "Limits on Super-Resolution and How to Break Them", by Baker et al., IEEE Transactions on Pattern Analysis and Machine Intelligence, Vol. 24, No. 9, September, 2002, pp. 1167-1183. Baker et al. propose a Bayesian formulation to the problem of making a super-resolution image from a low resolution image of a face. They use multiple features including the original image, 2nd order derivatives and 1st order derivatives.

The above approaches are computationally intensive, which limits their use. What is needed is a more direct approach that does not rely as heavily on statistical modeling to create information to be added to a low resolution image when constructing a higher resolution image (i.e., super-resolution image) from the low resolution image.

SUMMARY OF INVENTION

A first object of the present invention is to provide a super-resolution method/device that creates a higher resolution output image from a lower resolution input image while avoiding much of the computationally intensive statistics of the prior art.

A second object of the present invention is to provide super-resolution method/device with fast processing time and high quality results.

Another object of the present invention is to apply super-resolution to images of a human face.

These objects are met in a method/device of super-resolution that uses multiple codebooks (i.e., dictionaries) defined for each triangle in a face model mesh, nearest neighbor matching, and overlapping triangle regions to match a high resolution patch to a low-resolution patch while maintaining continuity across triangle boundaries. The super-resolution is done from a low-res reference frame to a high-res reference frame and then mapped back to the original face image. The present invention is an example-based approach rather then a model-based approach (in terms of the super-resolution algorithm, not to be confused with the face model). That is, the creation of the face model may utilize model-based statistical techniques, but once the face model and its related triangle mesh have been created, the super-resolution algorithm does not make use of a model-based approach.

A specific example of the present invention is method of creating from a first image, a second image of higher resolution than the first image, the method having the following steps: (A) defining as high resolution an image resolution substantially higher than the resolution of the first image; (B) defining as low resolution an image resolution substantially lower than the resolution of the second image; (C) providing a high resolution (HR) dictionary of triangularized high resolution (HR) images, each triangularized HR image having a common predefined number of triangles, the HR dictionary having a separate high resolution (HR) data entry for each triangle of each triangularized HR image; (D) providing a low resolution (LR) dictionary of triangularized low resolution (LR) images, each triangularized LR image having the common predefined number of triangles, the LR dictionary having a separate low resolution (LR) data entry for each triangle of each triangularized LR image; (E) assigning a one-to-one correspondence between each LR data entry and an HR data entry to form a data entry pair; (F) triangularizing the first image using a predefined triangularized model mesh having the common predefined number of triangles; (G) for each triangle in the triangularized first image, identifying its closest matching LR data entry within the LR dictionary, each closest matching LR data entry being a matched low resolution (MLR) entry; (H) for each MLR entry, identifying its corresponding HR data entry within the HR dictionary and associating the identified HR data entry to the MLR entry's corresponding triangle within the predefined triangularized model mesh; and (I) creating the second image by wrapping each identified HR data entry onto its associated triangle within the triangularized first image.

Preferably in step (A), the high resolution is further defined as a resolution substantially similar to the resolution of the second image; in step (B), the low resolution is further defined as a resolution substantially similar to the resolution of the first image, and in steps (D), each triangle within each triangularized LR image has the same number of pixels as its corresponding triangle in the triangularized LR image's corresponding triangularized HR image.

In the presently preferred embodiment, each of the LR images is a low resolution rendition of a corresponding one of the HR images. Additionally, each LR image and its corresponding HR image preferably form an image pair. In this case, for each image pair, the LR image and its corresponding HR image are both triangularized using the predefined triangularized model mesh. Furthermore in step (E), the LR data entry and HR data entry of each data entry pair are respectively from triangles of a LR image and HR image constituting an image pair, and the LR data entry and HR data entry of each data entry pair correlate to the same triangle in the predefined triangularized model mesh.

In the preferred embodiment, the predefined triangularized model mesh is defined by: aligning all of the HR images according to pre-specified landmarks; creating a mean image from all the aligned HR images; triangularizing the mean image; and defining the triangularized mean image as the predefined triangularized model mesh.

Following this approach, the HR images are preferably each images of a human face, and the predefined landmarks are at least one of eyes, nostrils, or mouth.

Additionally, step (C) preferably includes: wrapping each HR image onto the predefined triangularized model mesh; for each wrapped HR image, collecting the pixel information of each triangle on the predefined triangularized model mesh into the HR dictionary, each collection of pixel information of each triangle corresponding to each wrapped HR image being a separate group of pixel data, and each separate group of pixel data being a separate one of the HR data entries associated with its corresponding triangle within the predefined triangularized model mesh.

Further preferably, in step (D), each LR image is a low resolution rendition of a corresponding HR image in a one-to-one correspondence, and step (D) includes; wrapping each LR image onto the predefined triangularized model mesh; for each wrapped LR image, collecting the pixel information of each triangle on the predefined triangularized model mesh into the LR dictionary, each collection of pixel information of each triangle corresponding to each wrapped LR image being a separate group of pixel data, and each separate group of pixel data being a separate one of the LR data entries associated with its corresponding triangle within the predefined triangularized model mesh.

Furthermore, a one-to-one correlation is defined between each LR image and HR image to define an image pair, and in step (E), each data entry pair is defined by matching, within each image pair, the LR data entry and HR data entry of each triangle within the predefined triangularized model mesh. Additionally in step (E), the matching of the LR data entry and HR data entry includes applying border alignment to the identified HR data entries wrapped onto their associated triangle within the triangularized first image.

The above objects are further met in a method of creating from a first image, a second image of higher resolution than the first image, the method having the following steps: (A) providing a high resolution (HR) library of high resolution (HR) images and a high resolution (HR) mean image of the HR library, wherein high resolution is defined as a resolution substantially higher than the resolution of the first image; (B) providing a low resolution (LR) library of low resolution (LR) images, each LR image in the LR library being a low resolution rendition of a corresponding HR image in the HR library in a one-to-one relationship, each LR image and its corresponding HR image being an image pair, wherein low resolution is defined as a resolution substantially lower than the resolution of the second image; (C) providing a predefined triangularized model mesh; (D) providing a high resolution (HR) dictionary having a plurality of HR data sets of high resolution (HR) data entries, each HR data set including information resulting from triangularizing each HR image in the HR library using the predefined triangularized model mesh, each HR data entry within each HR data set corresponding to a separate triangle in the predefined triangularized model mesh, each HR data entry in each HR data set having a one-to-one correlation between a triangle in the predefined triangularized model mesh and its corresponding triangle in each of the triangularized HR images; (E) providing a low resolution (LR) dictionary having a plurality of LR data sets of low resolution (LR) data entries, each LR data set including information resulting from triangularizing each LR image in the LR library using the predefined triangularized model mesh, each LR data entry within each LR data set corresponding to a separate triangle in the predefined triangularized model mesh, each LR data entry in each LR data set having a one-to-one correlation between a triangle in the predefined triangularized model mesh and its corresponding triangle in each of the triangularized LR images, each LR data entry within each LR data set having a corresponding HR data entry in a corresponding HR data set based on the correspondence within each image pair; (F) triangularizing the first image using the predefined triangularized model mesh to define a triangularized first image; (G) for each triangle in the triangularized first image, identifying its closest matching LR data entry within the LR dictionary, each closest matching LR data entry being a matched low resolution (MLR) entry; (H) for each MLR entry, identifying its corresponding HR data entry within the HR dictionary and associating the identified HR data entry to the MLR entry's corresponding triangle within the predefined triangularized model mesh; and (I) creating the second image by wrapping each identified HR data entry onto its associated triangle within the triangularized first image.

In step (C) of this embodiment, the predefined triangularized model mesh is a triangularization of the HR mean image. Preferably step (A) includes aligning all HR images in the HD library according to predefined specified landmarks, the HR mean image being created from all the aligned HR images. Preferably, step (A) further includes applying border alignment to the identified HR data entries wrapped onto their associated triangle within the predefined triangularized first image.

Thus, the present objects are also met in a super resolution computing device for creating from an input first image, an output second image of higher resolution than the first image, the device having: (A) an input for receiving the input image; (B) a high resolution (HR) dictionary of triangularized high resolution (HR) images, wherein high resolution is defined as an image resolution substantially higher than the resolution of the first image, each triangularized HR image having a common predefined number of triangles, the HR dictionary having a separate high resolution (HR) data entry for each triangle of each triangularized HR image; (C) a low resolution (LR) dictionary of triangularized low resolution (LR) images, wherein low resolution is defined as an image resolution substantially lower than the resolution of the second image, each triangularized LR image having the common predefined number of triangles, the LR dictionary having a separate low resolution (LR) data entry for each triangle of each triangularized LR image, each LR data entry having a one-to-one correlation with a corresponding HR data entry; (D) a data processing unit for: (i) triangularizing the first image to have the common predefined number of triangles; (ii) for each triangle in the triangularized first image, identifying its closest matching LR data entry within the LR dictionary, each closest matching LR data entry being a matched low resolution (MLR) entry; (iii) for each MLR entry, identifying its corresponding HR data entry within the HR dictionary and associating the identified HR data entry to the MLR entry's corresponding triangle within the triangularized first image; and (iv) creating the second image by wrapping each identified HR data entry onto its associated triangle within the triangularized first image; and (E) an output for outputting the second image.

Preferably, each of the LR images is a low resolution rendition of a corresponding one of the HR images, wherein each LR image and its corresponding HR image constitute an image pair; and each of the LR images and HR images are triangularized with a common, triangularized model mesh defined by: aligning all of the HR images; creating a mean image from all the aligned HR images; and triangularizing the mean image; wherein the triangularized mean image is defined as the common, triangularized model mesh.

In this embodiment, the one-to-one correlation between each LR data entry and its corresponding HR data is based on the correlation between each LR data entry and its corresponding triangle in the triangularized model mesh and between the correlation between the corresponding triangle in the triangularized model mesh and its corresponding HR data entry, and based on the correspondence between each LR image and HR image in an image pair; and the first image is triangularizing using the common, triangularized model mesh.

Further preferably, the high resolution (HR) dictionary of triangularized high resolution (HR) images is defined by: (a) wrapping each HR image onto the common, triangularized model mesh; and (b) for each wrapped HR image, collecting the pixel information of each triangle on the triangularized model mesh into the HR dictionary, each collection of pixel information of each triangle corresponding to each wrapped HR image being a separate group of pixel data, and each separate group of pixel data being a separate one of the HR data entries associated with its corresponding triangle; and the low resolution (LR) dictionary of triangularized low resolution (LR) images is defined by: (1) wrapping each LR image onto the common, triangularized model mesh; (2) for each wrapped LR image, collecting the pixel information of each triangle on the triangularized model mesh into the LR dictionary, each collection of pixel information of each triangle corresponding to each wrapped LR image being a separate group of pixel data, and each separate group of pixel data being a separate one of the LR data entries associated with its corresponding triangle.

In this super resolution computing device, it is preferred that the input image, output image, HR images, and LR images each be images of human faces; and that all of the HR images be aligned in the construction of the mean image according to pre-specified landmarks including at least one of eyes, nostrils, or mouth.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
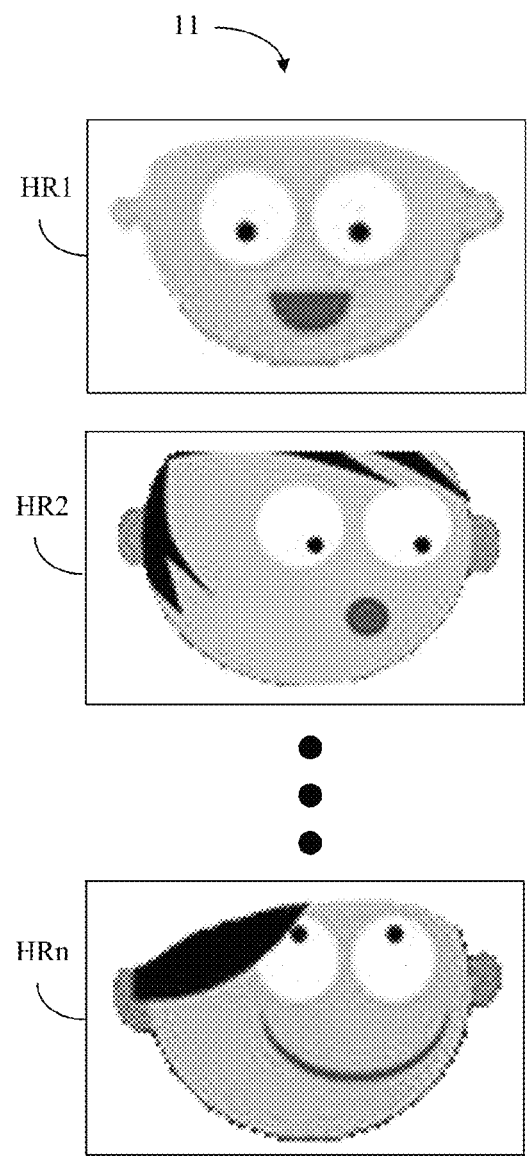
FIG. 1 is a pictorial representation of a high resolution (HR) library 11 of high resolution (HR) sample images HR1 to HRn.

A preferred method/device for implementing super-resolution of a input image (preferably an image of a human face) in accord with the present invention uses multiple codebooks (i.e., dictionaries of data entries or data vectors) defined for each triangle in a face model mesh, nearest neighbor matching, and overlapping triangle regions to match a low-resolution patch (i.e., triangle within a triangularized (or meshed) representation of the input image created using the face model mesh) to a high resolution patch (i.e., a data entry within a high resolution dictionary describing a high resolution triangle of comparable size and shape) while maintaining continuity across triangle boundaries. In the present case, the face model mesh is the result of a triangularized image of a model human face, such as a model polygon mesh of a three-dimensional face, as it is known in the art. The super-resolution is done from a low resolution reference frame (i.e., a low resolution triangle within the triangularized input first image) to a high resolution reference frame (i.e., a corresponding high resolution patch, or high resolution triangle) and then mapped back to the original face image (i.e., the original input first image).

The present invention is an example-based approach rather than a model-based approach (in terms of the super-resolution algorithm, not to be confused with the creation of a face model). That is, the creation of a face model (from which the face model mesh is created) may utilize model-based statistical techniques, as it is known in the art, but once the face model and its related face model mesh have been created, the super-resolution algorithm does not make use of a model-based approach (i.e., does not utilize model-based statistical techniques in the application of the present super-resolution technique).

The present invention may be better understood by providing a simplified example. After presentation of the present simplified example, a more practical implementation is shown below. For ease of explanation, it is further assumed that the image to be converter to a super-resolution image is an image of a human face. It is to be understood that the present invention is equally applicable to any class of object, such as human/animal organ structures, bone structures, street maps, tool types, animal/plant specie, etc.

In the following discussion, a low resolution input first image is to be converted to a higher resolution output second image. It is to be understood that the terms low resolution and high resolution are not strictly defined in the art. As used herein, the term low resolution may be characterized by pixilation in an in image that distorts the subject matter of the image and/or complicates identification of the subject matter. On the other hand, the term high resolution may be characterized by a reduction in pixilation and improvement in image definition, which simplifies identification of the subject matter of the image. Also for purposes of discussion, the term high resolution is used herein to mean an image resolution substantially higher than the resolution of the input first image, and preferably comparable to the resolution of the output second image. Similarly, the term low resolution is used to mean an image resolution substantially lower than the resolution of the output second image, and preferably comparable to the resolution the input first image.

In the present implementation, the objective is to receive the low resolution, input first image, which may be characterized by heavy pixilation, and create the high resolution, output second image from the first. The created high resolution, second output image is characterized by a reduction in pixilation and a substantial improvement in image definition.

With reference to FIG. 1, the present invention may begin by accessing a high resolution (HR) library 11 of high resolution (HR) sample images HR1 to HRn. For ease of explanation, this first simplified example uses cartoonish faces, but it is to be understood that the present invention is equally applicable to realistic human faces or to any other class of object sought.

A first step in the present invention is to provide a face model mesh, which is a triangularization of a model face. A key aspect of the present invention is that the same face model mesh is used in various stages of the present invention, and any suitable common, face model mesh may be used. However, it is presently preferred that the common, face model mesh be constructed from the mean of the HR sample images HR1 to HRn. A preferred method for doing this is to define the mean face of HR sample images HR1 to HRn as the model face, and then to triangularize the defined mean face. The resultant triangularization of the mean face defines the face model mesh to be used in various other stages of the present invention.

Figure 2:
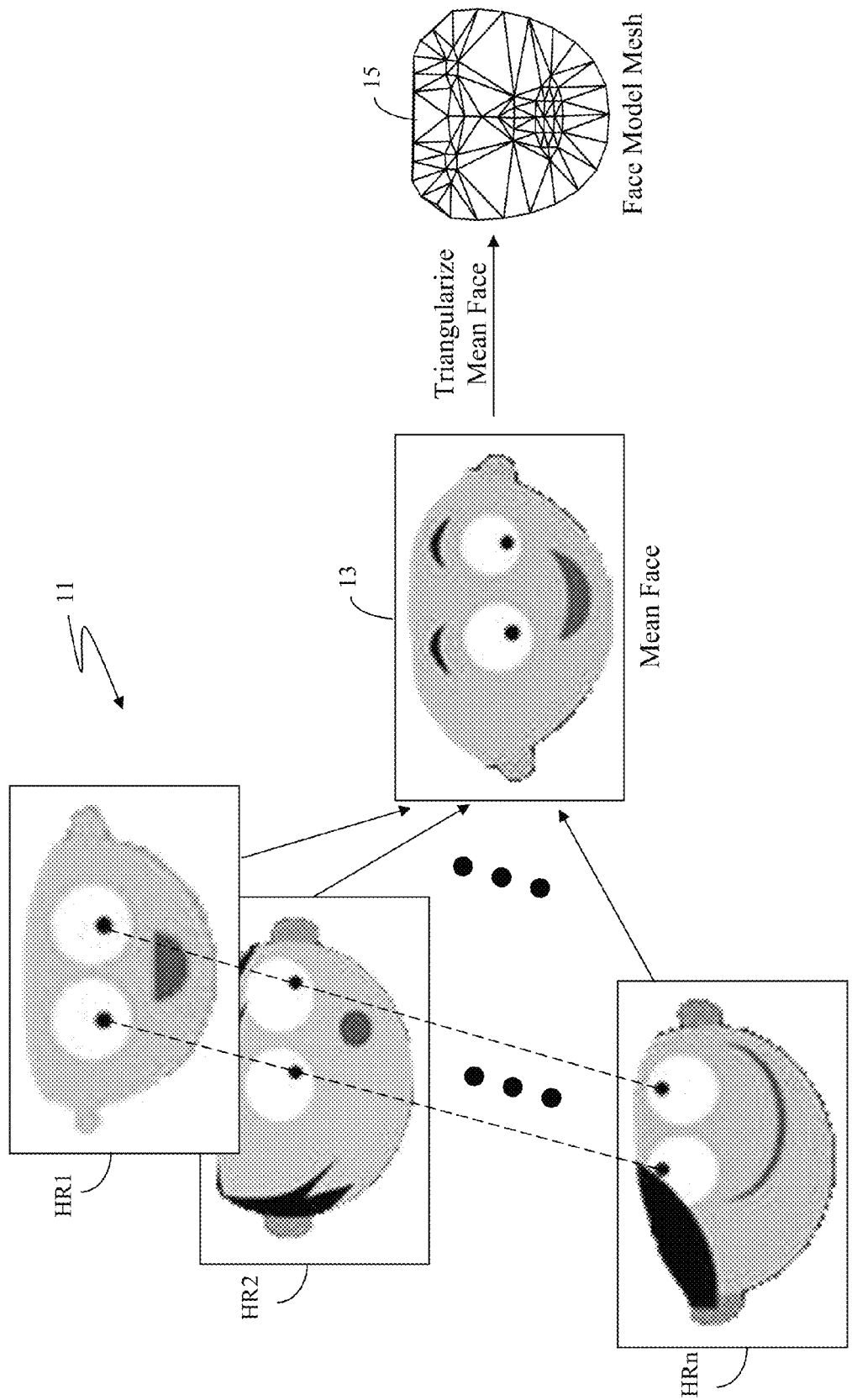
FIG. 2 illustrates a method of contracting a mean face and face model mesh.

With reference to FIG. 2, where all elements similar to those of FIG. 1 have similar reference characters and are described above, one approach towards constructing mean face 13 is illustrated. A preferred embodiment for creating mean face 13 first aligns all HR sample images HR1 to HRn along predefined landmark(s), or characteristic feature(s), such as eyes, nostrils, mouth, etc. As an illustration, alignment of HR sample images HR1 to HRn along eye pupils, to create mean face 13 is shown. It is to be understood that the more landmarks one uses, the better the alignment. Various methods for creating a mean face are known in the art, and any suitable method may be used. Once mean face 13 is created, it is triangularized to create face model mesh 15, as it is known in the art.

Figure 3:
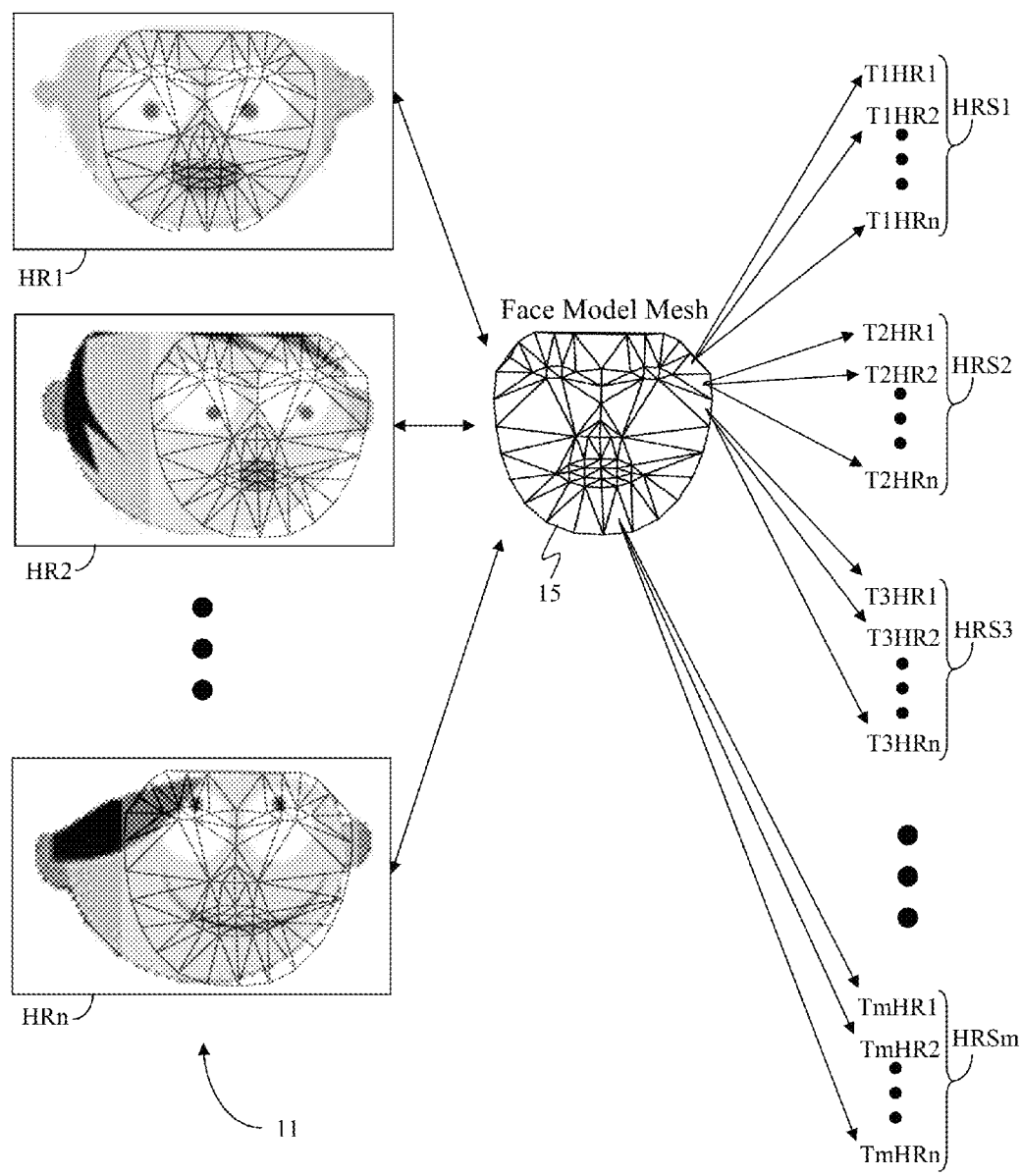
FIG. 3 illustrates construction of a high resolution (HR) dictionary using the HR library of FIG. 1 and face model mesh of FIG. 2.

With reference to FIG. 3, a next step is to create a high resolution (HR) dictionary of high resolution patch information (i.e., high resolution (HR) data entries). A preferred method of doing this is to triangularize each of HR sample images HR1 to HRn using face model mesh 15. That is, each image HR1 to HRn is separately wrapped onto face model mesh 15, resulting in a separate collection of triangles for each triangularized HR sample image, with each collection having the same number of triangles. The pixel information of each triangle constitutes a separate HR data entry in the above-mentioned HR dictionary. In the present example, it is assumed that face model mesh 15 has m triangles, and so each of the triangularized HR sample images HR1 to HRn is triangularized to have m triangles (i.e., m separate HR data entries per HR sample image).

For ease of explanation, each of the n HR data entries corresponding to the same triangle within each of the n triangularized HR sample images may be grouped into m separate high resolution data sets of HR data entries, HRS1 to HRSm; one high resolution data set (HRS1 to HRSm) of n data entries for each of the m triangles of face model mesh 15.

Each high resolution data set HRS1 to HRSm is a collection n HR data entries (i.e., pixel information) from the same corresponding triangle in each triangularized HR sample image. For example if the triangles of face model mesh 15 are numbered TR1 through TRm, and data set HRS1 consists of HR data entries T1HR1 to T1HRn, then it may be understood that HR data entry T1HR1 is a collection of pixel information for first triangle (T1) of triangularized sample image HR1. Similarly, HR data entry T1HR2 is a collection of pixel information for the same first triangle (T1) of triangularized sample image HR2, and so on to an $n^{th}$ HR data entry (T1HRn), which is a collection of pixel information for the same first triangle (T1) of triangularized sample image HRn. In like fashion, HRS2 is a collection of pixel information (T2HR1, T2HR2, ... T2HRn) of a common second triangle (T2) from each of triangularized sample image HR1 to HRn. HRS3 is a collection of pixel information (T3HR1, T3HR2,... T3HRn) of a common third triangle (T3) from each of triangularized sample images HR1 to HRn, and so on to data set HRSm, which is a collection HR data entries (TmHR1, TmHR2, ... TmHRn) of the same common last triangle Tm (i.e.,, the $m^{th}$ triangle) from each of triangularized sample images HR1 to HRn. High resolution data sets HRS1 to HRSm constitute the HR dictionary.

Another step in the present invention is to create a low resolution (LR) dictionary. This starts by obtaining a low resolution (LR) library of low resolution (LR) sample images.

Figure 4:
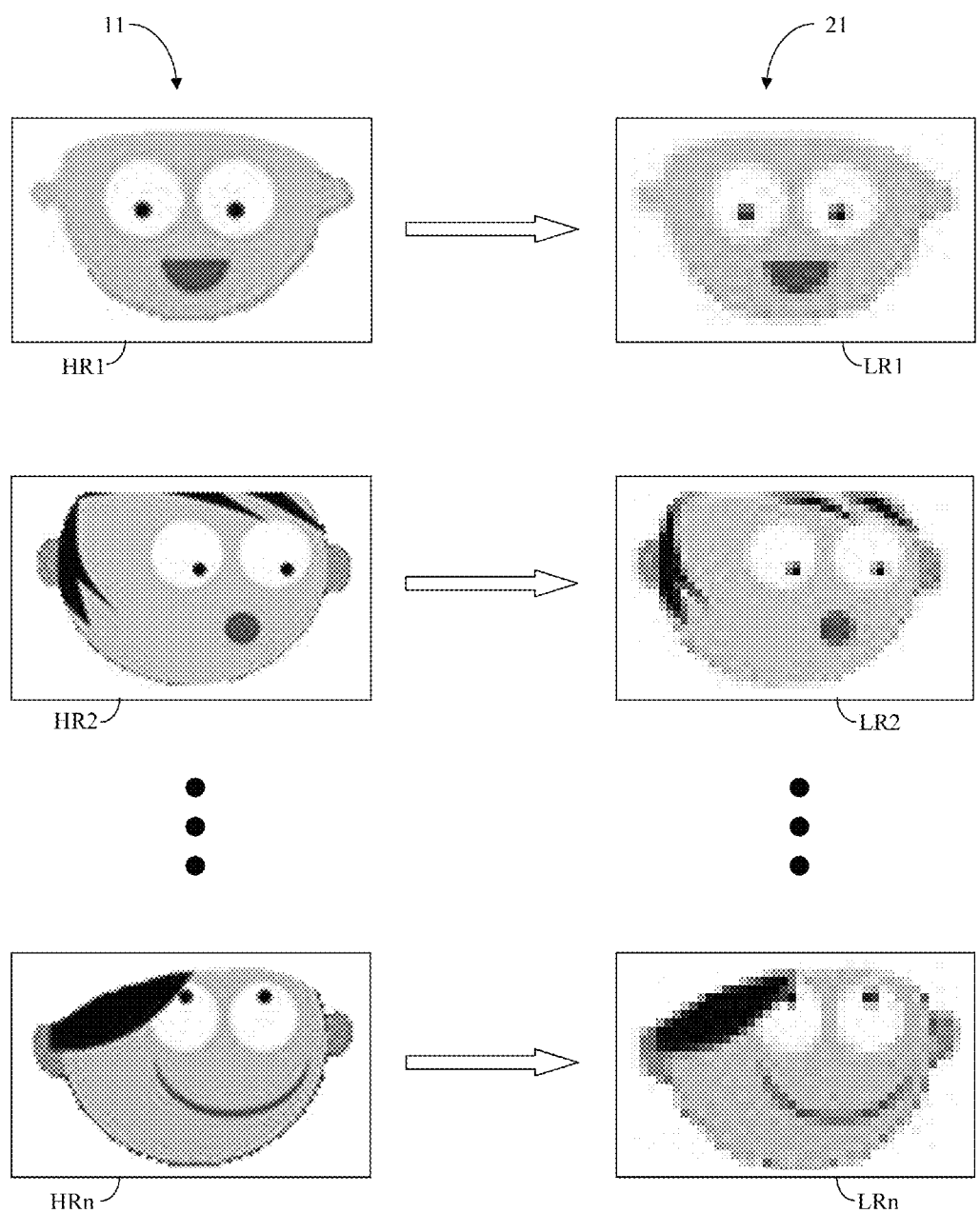
FIG. 4 illustrates a construction of a low resolution (LR) library of images from the HR library of FIG. 1.

With reference to FIG. 4, in the presently preferred embodiment, this is achieved by creating LR dictionary 21 from HR library 11. To achieve this, a low resolution rendition LR1 to LRn of each high definition sample image HR1 to HRn is created. That is, each low resolution (LR) images LR1 to LRn is a low resolution rendition of a corresponding high resolution sample images HR1 to HRn. Thus, each low resolution image corresponds to a high resolution image, which together constitutes an image pair. For example, low resolution image LR1 corresponds to high resolution image HR1, and together LR1 and HR1 form an image pair.

Creation of a low resolution (LR) dictionary of low resolution patch information (i.e., low resolution (LR) data entries) is preferably analogous to the creation of the high resolution (HR) dictionary, as illustrated in FIG. 3.

Figure 5:
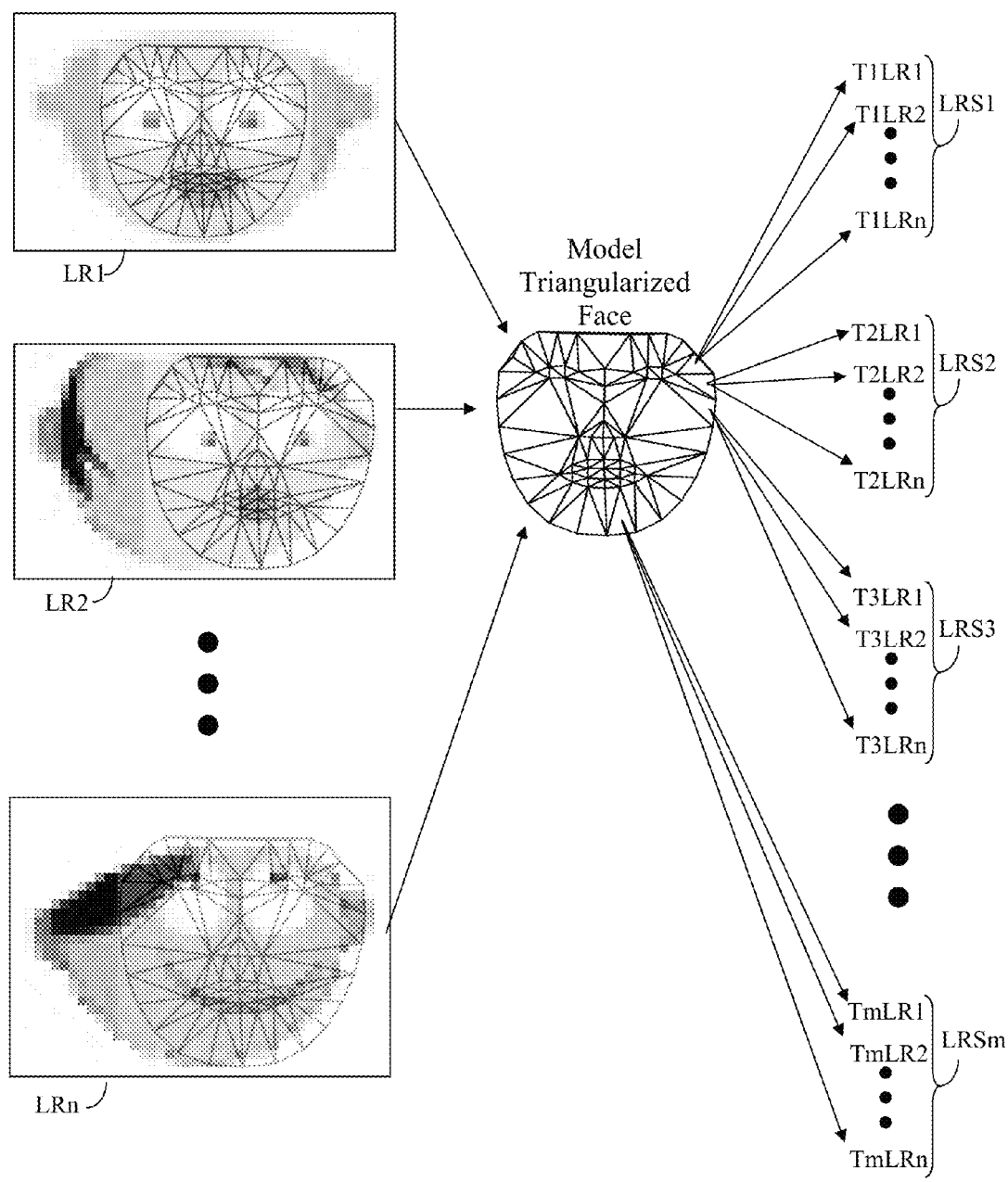
FIG. 5 illustrates construction of a low resolution (LR) dictionary using the LR library of FIG. 4 and face model mesh of FIG. 2.

With reference to FIG. 5, a preferred method of constructing the low resolution dictionary is to triangularize each of LR sample images LR1 to LRn using face model mesh 15. That is, each image LR1 to LRn is separately wrapped onto face model mesh 15, resulting in a separate collection of triangles for each triangularized LR sample image, with each collection having the same number of triangles. The pixel information of each triangle constitutes a separate LR data entry in the above-mentioned LR dictionary. Since in the present example face model mesh 15 has m triangles, each of the triangularized LR sample images LR1 to LRn is triangularized to have m triangles (i.e., m separate LR data entries per LR sample image).

For ease of explanation, each of the n LR data entries corresponding to the same triangle within each of the n triangularized LR sample images may be grouped into m separate low resolution data sets of LR data entries. Specifically, LRS1 to LRSm are low resolution data sets of n data entries for each of the m triangles of face model mesh 15. Each low resolution data set LRS1 to LRSm is a collection n LR data entries (i.e., pixel information) from the same corresponding triangle in each triangularized LR sample image. For example, since data set LRS1 consists of LR data entries T1LR1 to T1LRn, it may be understood that LR data entry T1LR1 is a collection of pixel information for first triangle (T1) of triangularized sample image LR1. Similarly, LR data entry T1LR2 is a collection of pixel information for the same first triangle (T1) of triangularized sample image LR2, and so on to an $n^{th}$ LR data entry (T1LRn), which is a collection of pixel information for the same first triangle (T1) of triangularized sample image LRn. In like fashion, LRS2 is a collection of pixel information (T2LR1, T2LR2, ... T2LRn) of a common second triangle (T2) from each of triangularized sample image LR1 to LRn. LRS3 is a collection of pixel information (T3LR1, T3LR2, ... T3LRn) of a common third triangle (T3) from each of triangularized sample images LR1 to LRn, and so on to data set LRSm, which is a collection LR data entries (TmLR1, TmLR2, ... TmLRof the same common last triangle Tm (i.e.,, the $m^{th}$ triangle) from each of triangularized sample images LR1 to LRn. Low resolution data sets LRS1 to LRSm constitute the LR dictionary.

A next step is to associate each LR data entry with its corresponding HR data entry based on their data entry pair relationship and their triangle correspondence. Since data entries for each triangle of triangles T1 to Tm are collected into high resolution data sets HRS1 to HRSm, respectively, and low resolution data set LRS1 to LRSm, respective, FIG. 5 illustrates the defining of data entry pairs in terms of correspondence between data sets.

For example, FIG. 4 shows that images HR1 and LR1 form one image pair. FIG. 3 shows that HR1's data entry for triangle T1 is T1HR1, and FIG. 5 shows that LR1's data entry for the same triangle T1 is T1LR1. Thus, low resolution data entry T1LR1 is associated with its corresponding high resolution data entry, T1HR1.

Figure 6:
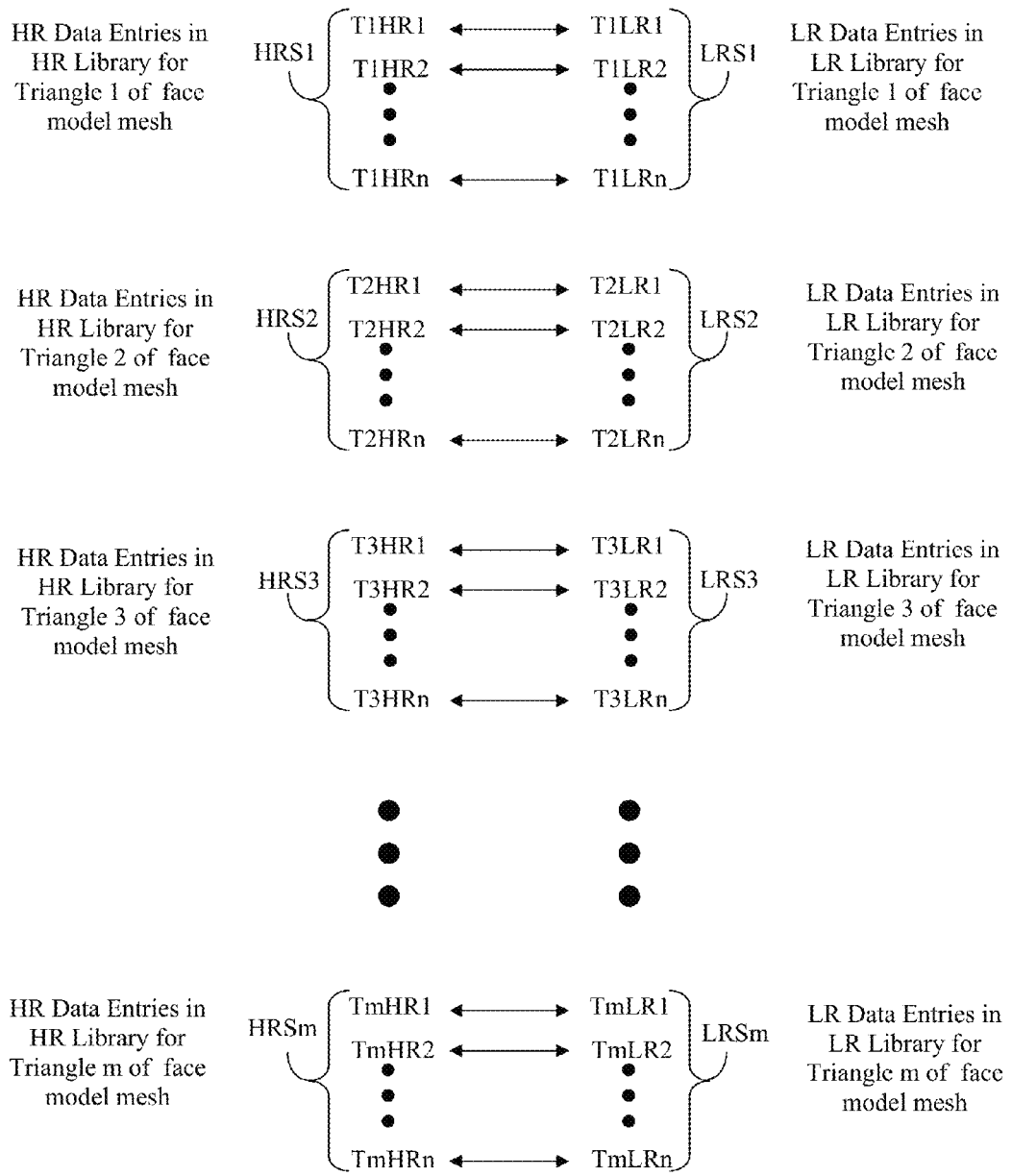
FIG. 6 illustrates the correlating of data entries in the HR dictionary with data entries in the LR dictionary.

The association of all low resolution data entries with their corresponding high resolution data entries is illustrated in FIG. 6. For example, the associations relating to triangle T1 are shown as T1HR1↔T1LR1, T1HR2↔T1LR2, T1HR3↔T1LR3, and so on to the last data entry pair T1HRn↔T1LRn. Similarly, the data entry pair associations relating to triangle T2 are shown as T2HR1↔T2LR1, T2HR2↔T2LR2, T2HR3↔T2LR3, and so on to the last data entry pair T2HRn↔T2LRn. This continues to the last triangle m of face model mesh 15. Thus, the data entry pairs for triangle m are TmHR1↔TmLR1, TmHR2↔TmLR2, TmHR3↔TmLR3, and so on to the last data entry pair TmHRn↔TmLRn.

Before addressing how the associated high resolution and low resolution dictionaries are used to construct an output image of higher resolution than an input image, it may be beneficial to briefly discuss the process steps up to this point.

Figure 7:
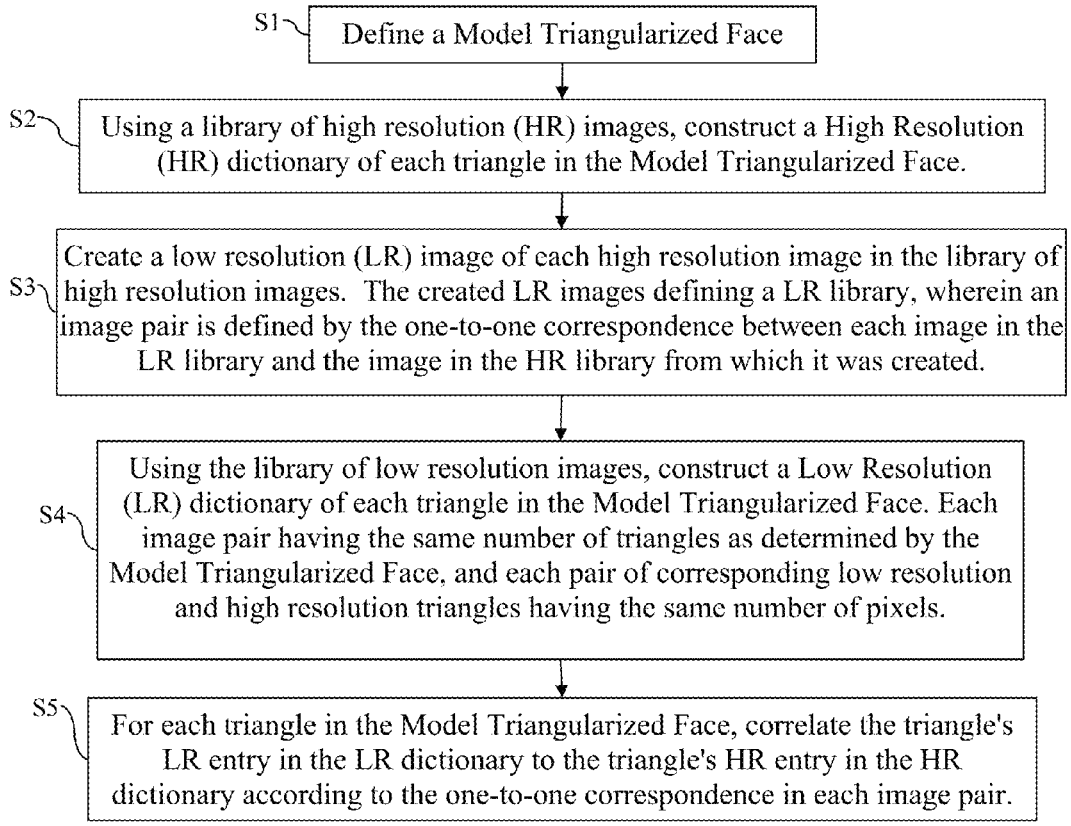
FIG. 7 illustrates a process for constructing an HR dictionary with data entries correlated to data entries in a LR dictionary.

With reference to FIG. 7, assuming that one has a high resolution library (HR library) of high resolution images, a first step is to define a model triangularized face (step S1). This may be achieved by the process of FIG. 8.

Figure 8:
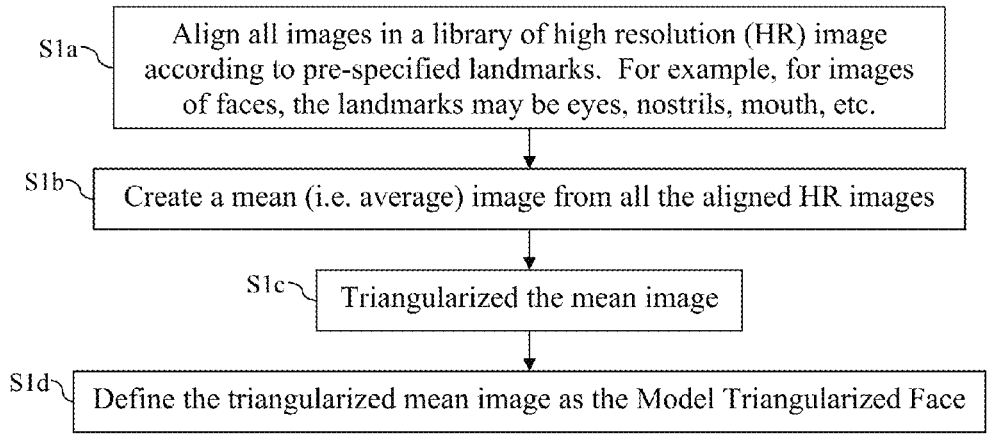
FIG. 8 illustrates a process for constructing a model triangularized face using an HR library of HR images.
Figure 12:
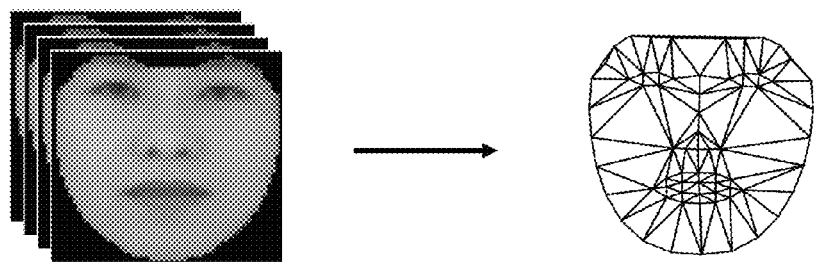
FIG. 12 illustrates a step in the construction of the HR dictionary and the LR dictionary.

With reference to FIG. 8, the model triangularized face may be defined by first (step S1a) aligning all images in the HR library according to pre-specified landmarks. For example, for images of faces, the landmarks may be eyes, nostrils, mouth, etc. A next step, S1b, is to create a mean (i.e. average) high resolution image from all the aligned HR images. The mean face is then triangularized (step S1c). Finally, the triangularized mean image is defined as the model triangularized face (step S1d). An illustration of this process is shown in FIG. 12.

Returning to FIG. 7, after defining the model triangularized face (step S1), a next step is to construct a high resolution dictionary of each triangle in the model triangularized face for all images in the high resolution dictionary (step S2). This may be achieved by the process of FIG. 9

Figure 9:
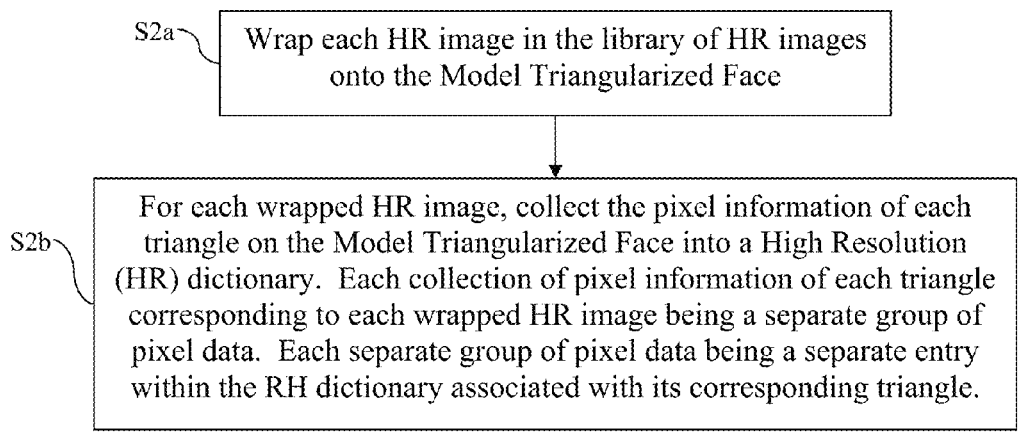
FIG. 9 illustrates a process for constructing an HR dictionary.

With reference to FIG. 9, the high resolution dictionary may be constructed by first wrapping each HR image in the HR library onto the model triangularized face (step S2a). For each wrapped HR image, pixel information of each triangle on the model triangularized face is collected into a high resolution (HR) dictionary (step S2b). Each collection of pixel information of each triangle corresponding to each wrapped HR image defines a separate group of pixel data, and each separate group of pixel data preferably constitutes a separate entry within the HR dictionary associated with the specific triangle from which it was defined.

Returning to FIG. 7, after constructing the HR dictionary for each triangle (step S2), a next step S3 is to create a low resolution (LR) image of each high resolution image in the HR library. The created low resolution images define a library of low resolution images (i.e. a LR library), wherein each image in the low resolution library having a one-to-one correspondence with the image in the high resolution library from which it was created. Thus, each LR image and its corresponding HR image form an image pair.

Figure 10:
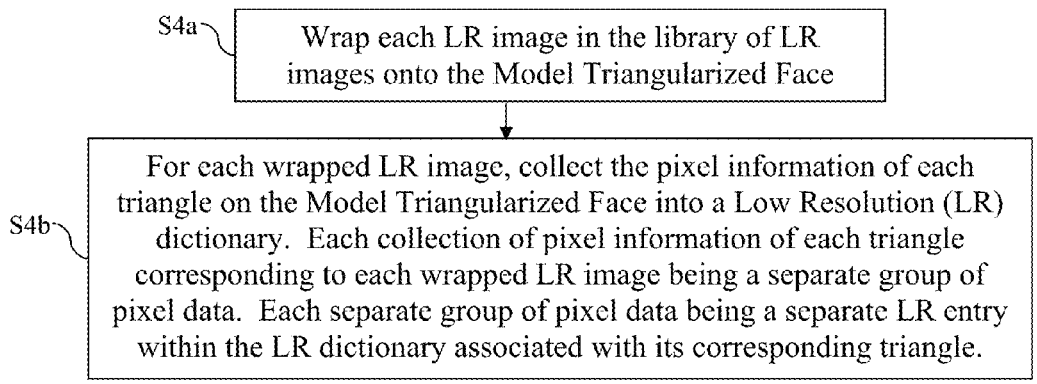
FIG. 10 illustrates a process for constructing a LR dictionary.

Next in step S4, using the LR library, one constructs a low resolution (LR) dictionary of each triangle in the model triangularized face. An example of this is illustrated in FIG. 10, where the LR dictionary is constructed by first wrapping each LR image in the LR library onto the model triangularized face (step S4a). For each wrapped LR image, pixel information of each triangle on the model triangularized face is collected into the LR dictionary (step S4b). Each collection of pixel information of each triangle corresponds to each wrapped LR image, and defines a separate group of pixel data, and each separate group of pixel data preferably constitutes a separate entry within the LR dictionary associated with the specific triangle from which it was defined. Since the high resolution images and low resolution images in each image pair are triangularized using the same model triangularized face, each image pair is triangularized into the same number of triangles, and each triangle in the triangularized low resolution face corresponds to a triangle in the high resolution face to form a corresponding triangle pair. Further preferably, the triangles in each triangle pair have the same number of pixels.

Finally as shown in step S5 of FIG. 5, for each triangle in the Model Triangularized Face, each triangle's LR entry in the LR dictionary is correlated to its corresponding HR entry in the HR dictionary according to the one-to-one correspondence in each image pair.

After the LR and HR dictionaries are constructed, and the correlation between their data entries have been established, as described in accordance with FIGS. 7 to 10, the present invention may then be applied to the construction of a super resolution image from a given input image.

Figure 11:
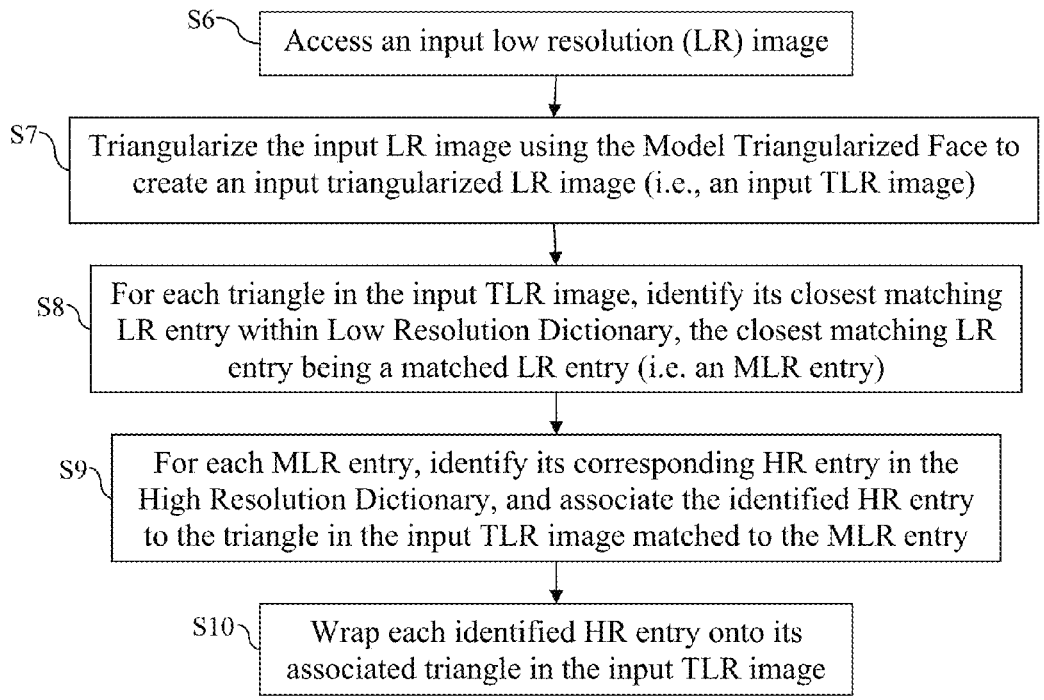
FIG. 11 illustrates an overview of a process flow in accord with the present invention for constructing a second image of higher resolution than a first image.

With reference FIG. 11, a first step is to access an input low resolution (LR) image (S6). Next, the input LR image is triangularized using the model triangularized face to create an input triangularized low resolution image (i.e., an input TLR image), as indicated in step S7. Each triangle in the input TLR image is then compared with the LR dictionary. That is, for each triangle in the input TLR image, its closest matching LR entry within the LR dictionary is identified (step S8). This closest matching LR data entry may be identified as a matched LR entry (i.e. an MLR entry).

In step S9, for each MLR entry, its correlated HR entry in the HR dictionary is identified, and this identified HR entry is associated to the triangle in the input TLR image that is matched to the MLR entry.

Finally in step S10, each identified HR data entry is wrapped onto its associated triangle in the input TLR image (as determined in step S9).

If desired a smoother image may be provided by applying border alignment to the identified HR data entries wrapped onto the input TLR image. Use of this optional boarder alignment, however, requires some preparation.

The HR dictionary was constructed in steps S2 and S3, above, by triangularizing the HR images, and the LR dictionary was constructed in steps S4 and S5, above, by triangularizing the LR images. In order to use the optional boarder alignment of step S11, one may define a boarder area for each triangle within each triangularized face.

Figure 13:
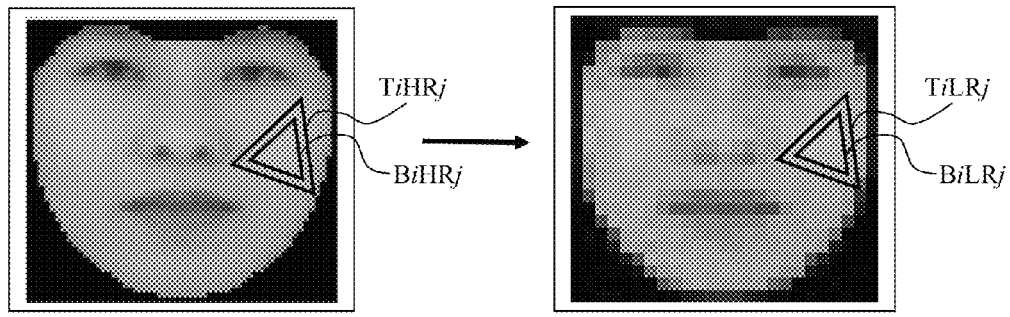
FIG. 13 illustrates the defining of a boarder area around each triangle of a triangularized face.

For example, FIG. 13 shows an image pair consisting of a high resolution image HRj and corresponding low resolution LRj. A sample triangle TiHRj within the triangularized image HRj is shown for illustration. The correlated triangle TiLRj within the triangularized image LRj is also shown. A border BiHRj is defined around triangle TiHRj. Similarly, a border BiLRj is defined around triangle TiLRj.

Figure 14:
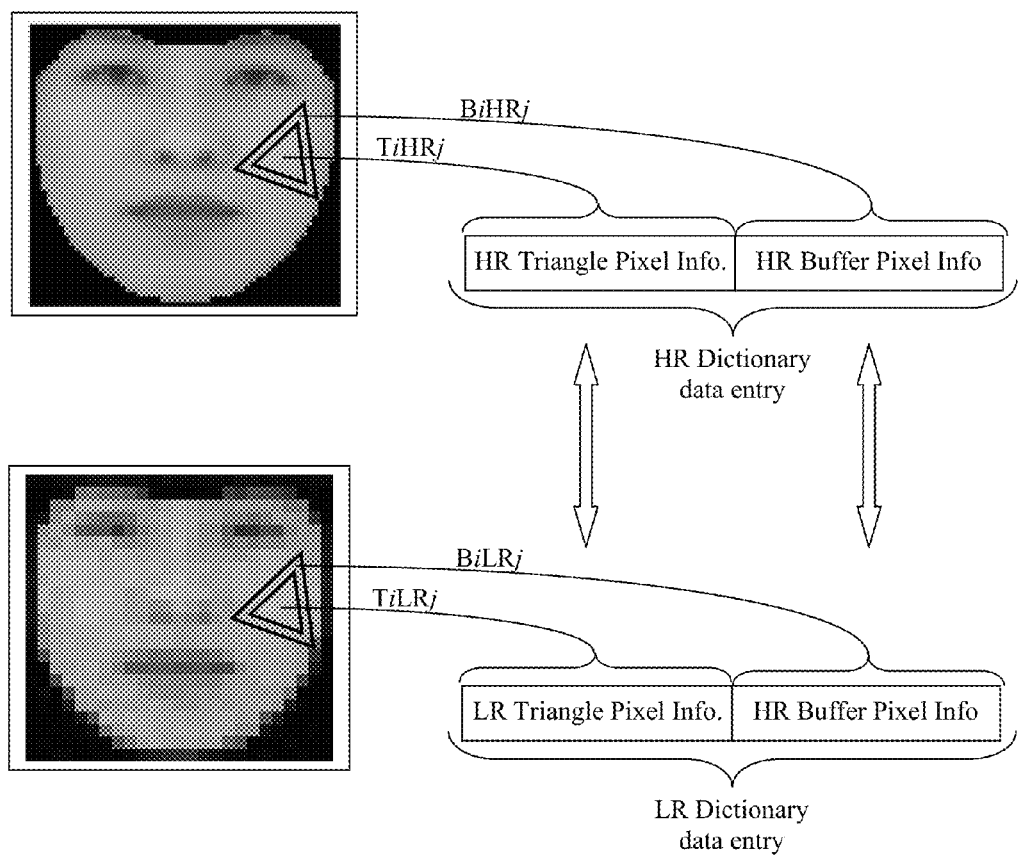
FIG. 14 illustrates the incorporation of a boarder area data into each data entry within the HR dictionary and LR dictionary.

As illustrated in FIG. 14, border BiHRj becomes part of the data entry information corresponding to triangle TiHRj by being appended to the pixel information of triangle TiLRj. Similarly, border BiLRj becomes part of the data entry information corresponding to triangle TiLRj. The two data entries are then associated with each as explained above.

Figure 15:
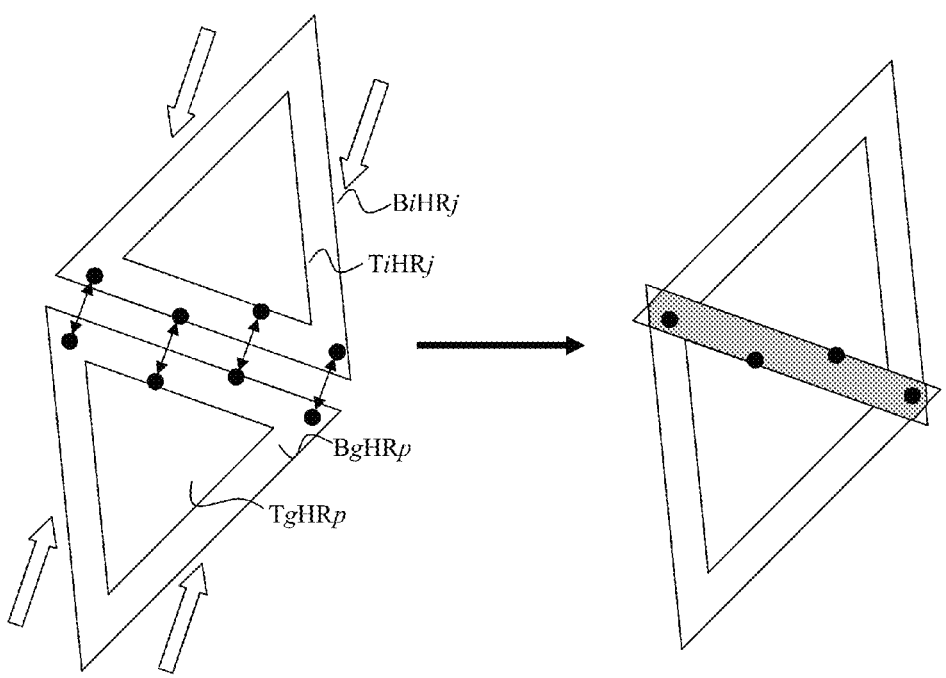
FIG. 15 illustrates a sample of an application boarder alignment, such as described in FIG. 11 in the construction of a super resolution image.

Thus when border alignment is applied, each data entry, such as in the HR dictionary, already has a defined border region. FIG. 15 illustrates an example of this.

With reference to FIG. 15 two high resolution triangles TiHRj and TgHRp that are to be placed next to each other in the construction of a super resolution image are shown. Also shown are their corresponding boarder regions BiHRj and BgHRp, and identified landmark pointes within each boarder region that correspond to the same pixel locations within a triangularized face. As the two triangles TiHRj and TgHRp are brought together and their corresponding landmark points are matched, a smooth transition is defined within the adjoined triangles TiHRj and TgHRp.

Preferably, the border pixels are considered along with the primary LR pixel data (the internal part of a triangle) as the primary LR pixel data is matched to an LR dictionary data entry (and corresponding HR pixel data entry). Thus, border alignment and data entry matching preferably happen at the same time. Preferably, as each triangle is filled in, one can start to use its HR pixels in the border pixel alignment for neighboring triangles. In this approach, the very first triangle would not have any border pixel to align to. Optionally, border pixels may be weighted separately from the primary pixel data of a triangle when searching for the closest matching dictionary entry for a given triangle.

For example, when searching for the closest matching LR data entry, one can weight the borders separately. This is useful if some of the neighboring triangles have not yet been filled with HR pixel data. One example of an implementation of this would be as follows:
given:
   $P_n$=LR pixel data from triangularized image for $n^{th}$
   $B_n(i)$=Border pixel data on $i^{th}$ edge of $n^{th}$
   $W(i)$=weight coefficient for border pixels along $i^{th}$ edge
   $BHR(i)$=border pixels already filed in on $i^{th}$ edge
$\min \|T1LR_n - P_n\| + w(1)*\|BHR(1) - B_n(1)\| + w(2)*\|BHR(2) - B_n(2)\| + w(3)*\|BHR(3) - B_n(3)\|$, wherein this is minimized over n.

One efficient way to find the closest matching dictionary entry would be to do a greedy tree-based approximate nearest neighbor search or use locality sensitive hashing. These approaches most likely would not find the optimal solution, but would quickly find a solution close to optimal.

It is to be understood that the first triangle filled in would have no bordering HR pixels to compare against. Also, as other LR pixel data is filled in with the HR pixel data it is possible that only 1 or 2 of the edges may have HR border pixel data from filling in HR pixel data in a neighboring triangle. In these cases, the weights can be set to zero when searching for the best match.

Once all the triangles have been filed in with HR pixel data, one can make one more pass through the LR triangularized image. This time, one would match the HR boarder pixel data on all edges for all triangles. This should give a better fit for some of the triangles which were previously filled with HR pixel data without the knowledge of the border HR pixel data on the first pass.

Figure 16:
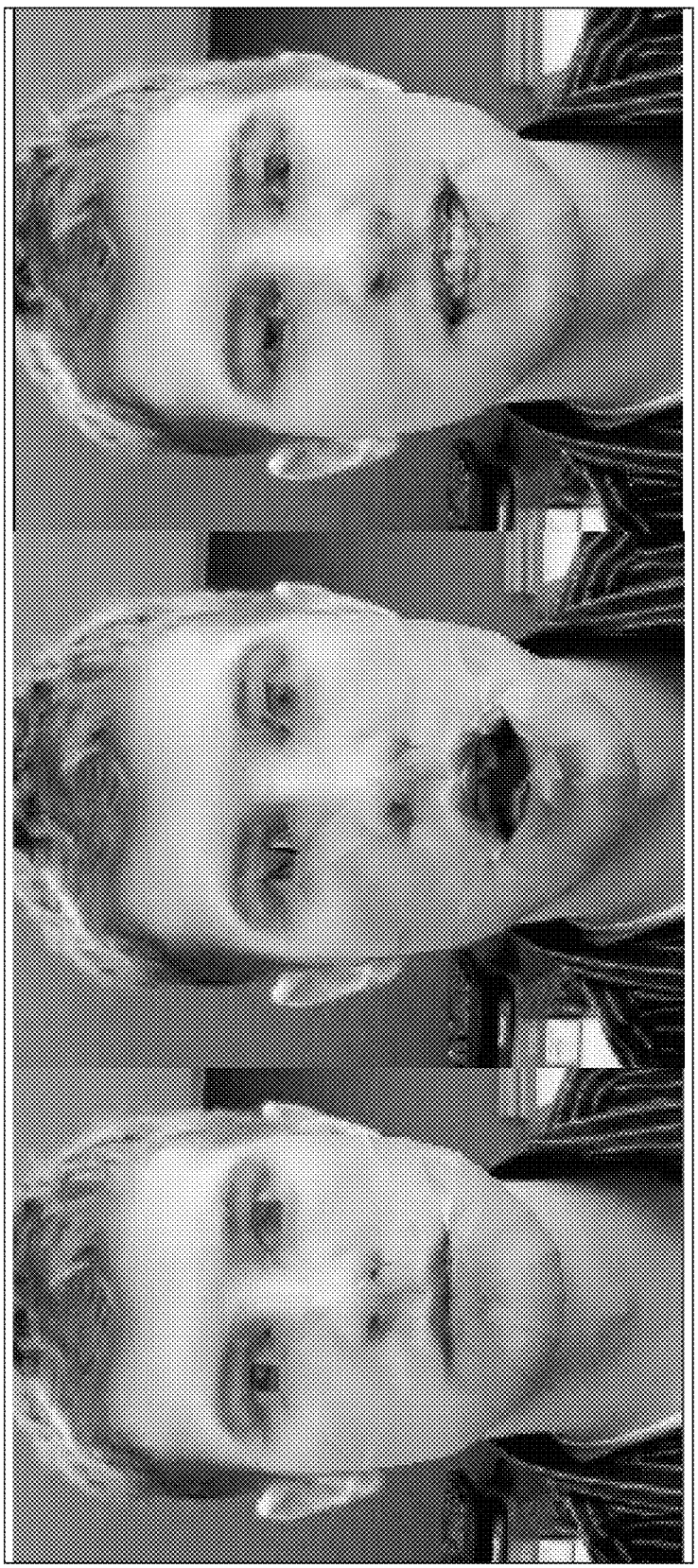
FIG. 16 illustrates three sample resolution images in accord with the present invention.

Three examples of super resolution images constituted by the method of the present invention, excluding the optional step of aligning boarder regions, are illustrated in FIG. 16. As shown, the present invention achieves realistic higher resolution reconstructions of human faces from low resolution images, not shown. It is to be understood that if boarder alignment step S11 were applied to the examples of FIG. 16, a significant amount of the visible jaggedness would be eliminated.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of creating from a first image, a second image of higher resolution than the first image, the method comprising the following steps:
   (A) defining as high resolution an image resolution substantially higher than the resolution of said first image;
   (B) defining as low resolution an image resolution substantially lower than the resolution of said second image;
   (C) providing a high resolution (HR) dictionary of triangularized high resolution (HR) images, each triangularized HR image having a common predefined number of triangles, said HR dictionary having a separate high resolution (HR) data entry for each triangle of each triangularized HR image;
   (D) providing a low resolution (LR) dictionary of triangularized low resolution (LR) images, each triangularized LR image having said common predefined number of triangles, said LR dictionary having a separate low resolution (LR) data entry for each triangle of each triangularized LR image;
   (E) assigning a one-to-one correspondence between each LR data entry and an HR data entry to form a data entry pair;
   (F) triangularizing said first image using a predefined triangularized model mesh having said common predefined number of triangles;
   (G) for each triangle in the triangularized first image, identifying its closest matching LR data entry within said LR dictionary, each closest matching LR data entry being a matched low resolution (MLR) entry;
   (H) for each MLR entry, identifying its corresponding HR data entry within said HR dictionary and associating the identified HR data entry to the MLR entry's corresponding triangle within said predefined triangularized model mesh; and
   (I) creating said second image by wrapping each identified HR data entry onto its associated triangle within the triangularized first image.

2. The method of claim 1, wherein:
   in step (A), said high resolution is further defined as a resolution substantially similar to the resolution of said second image;
   in step (B), said low resolution is further defined as a resolution substantially similar to the resolution of said first image; and
   in step (D), each triangle within each triangularized LR image has the same number of pixels as its corresponding triangle in the triangularized LR image's corresponding triangularized HR image.

3. The method of claim 1, wherein each of said LR images is a low resolution rendition of a corresponding one of said HR images, each LR image and its corresponding HR image forming an image pair.

4. The method of claim 3, wherein for each image pair, the LR image and its corresponding HR image are both triangularized using said predefined triangularized model mesh.

5. The method of claim 4, wherein in step (E), the LR data entry and HR data entry of each data entry pair are respectively from triangles of a LR image and HR image constituting an image pair, and the LR data entry and HR data entry of each data entry pair correlate to the same triangle in said predefined triangularized model mesh.

6. The method of claim 4, wherein said predefined triangularized model mesh is defined by:
   aligning all of said HR images according to pre-specified landmarks;
   creating a mean image from all the aligned HR images;
   triangularizing said mean image; and
   defining the triangularized mean image as said predefined triangularized model mesh.

7. The method of claim 6, wherein said HR images are each images of a human face, and said predefined landmarks are at least one of eyes, nostrils, or mouth.

8. The method of claim 2, wherein step (C) includes:
   wrapping each HR image onto said predefined triangularized model mesh;
   for each wrapped HR image, collecting the pixel information of each triangle on the predefined triangularized model mesh into said HR dictionary, each collection of pixel information of each triangle corresponding to each wrapped HR image being a separate group of pixel data, and each separate group of pixel data being a separate one of said HR data entries associated with its corresponding triangle within said predefined triangularized model mesh.

9. The method of claim 8, wherein in step (D) each LR image is a low resolution rendition of a corresponding one of said HR images in a one-to-one correspondence, and step (D) includes:
   wrapping each LR image onto said predefined triangularized model mesh;
   for each wrapped LR image, collecting the pixel information of each triangle on the predefined triangularized model mesh into said LR dictionary, each collection of pixel information of each triangle corresponding to each wrapped LR image being a separate group of pixel data, and each separate group of pixel data being a separate one of said LR data entries associated with its corresponding triangle within said predefined triangularized model mesh.

10. The method of claim 9, wherein a one-to-one correlation is defined between each LR image and HR image to define an image pair, and
    in step (E), each data entry pair is defined by matching, within each image pair, the LR data entry and HR data entry of each triangle within said predefined triangularized model mesh.

11. The method of claim 10, wherein in step (E), said matching of the LR data entry and HR data entry includes applying border alignment to the identified HR data entries wrapped onto their associated triangle within the triangularized first image.

12. A method of creating from a first image, a second image of higher resolution than the first image, said method comprising the following steps:
    (A) providing a high resolution (HR) library of high resolution (HR) images and a high resolution (HR) mean image of said HR library, wherein high resolution is defined as a resolution substantially higher than the resolution of said first image;
    (B) providing a low resolution (LR) library of low resolution (LR) images, each LR image in said LR library being a low resolution rendition of a corresponding HR image in said HR library in a one-to-one relationship, each LR image and its corresponding HR image being an image pair, wherein low resolution is defined as a resolution substantially lower than the resolution of said second image;
    (C) providing a predefined triangularized model mesh;
    (D) providing a high resolution (HR) dictionary having a plurality of HR data sets of high resolution (HR) data entries, each HR data set including information resulting from triangularizing each HR image in said HR library using said predefined triangularized model mesh, each HR data entry within each HR data set corresponding to a separate triangle in said predefined triangularized model mesh, each HR data entry in each HR data set having a one-to-one correlation between a triangle in said predefined triangularized model mesh and its corresponding triangle in each of the triangularized HR images;

(E) providing a low resolution (LR) dictionary having a plurality of LR data sets of low resolution (LR) data entries, each LR data set including information resulting from triangularizing each LR image in said LR library using said predefined triangularized model mesh, each LR data entry within each LR data set corresponding to a separate triangle in said predefined triangularized model mesh, each LR data entry in each LR data set having a one-to-one correlation between a triangle in said predefined triangularized model mesh and its corresponding triangle in each of the triangularized LR images, each LR data entry within each LR data set having a corresponding HR data entry in a corresponding HR data set based on said correspondence within each image pair;

(F) triangularizing said first image using said predefined triangularized model mesh to define a triangularized first image;

(G) for each triangle in the triangularized first image, identifying its closest matching LR data entry within said LR dictionary, each closest matching LR data entry being a matched low resolution (MLR) entry;

(H) for each MLR entry, identifying its corresponding HR data entry within said HR dictionary and associating the identified HR data entry to the MLR entry's corresponding triangle within said predefined triangularized model mesh; and (I) creating said second image by wrapping each identified HR data entry onto its associated triangle within said triangularized first image.

13. The method of claim 12, wherein in step (C), said predefined triangularized model mesh is a triangularization of said HR mean image.

14. The method of claim 13, wherein step (A) includes aligning all HR images in said HD library according to predefined specified landmarks, said HR mean image being created from all the aligned HR images.

15. The method of claim 14, wherein step (A) further includes, applying border alignment to the identified HR data entries wrapped onto their associated triangle within said predefined triangularized first image.

16. A super resolution computing device for creating from an input first image, an output second image of higher resolution than the first image, said device comprising:

(A) an input for receiving said input image;

(B) a high resolution (HR) dictionary of triangularized high resolution (HR) images, wherein high resolution is defined as an image resolution substantially higher than the resolution of said first image, each triangularized HR image having a common predefined number of triangles, said HR dictionary having a separate high resolution (HR) data entry for each triangle of each triangularized HR image;

(C) a low resolution (LR) dictionary of triangularized low resolution (LR) images, wherein low resolution is defined as an image resolution substantially lower than the resolution of said second image, each triangularized LR image having said common predefined number of triangles, said LR dictionary having a separate low resolution (LR) data entry for each triangle of each triangularized LR image, each LR data entry having a one-to-one correlation with a corresponding HR data entry;

(D) a data processing unit for:
(i) triangularizing said first image to have said common predefined number of triangles;
(ii) for each triangle in the triangularized first image, identifying its closest matching LR data entry within said LR dictionary, each closest matching LR data entry being a matched low resolution (MLR) entry;
(iii) for each MLR entry, identifying its corresponding HR data entry within said HR dictionary and associating the identified HR data entry to the MLR entry's corresponding triangle within said triangularized first image; and
(iv) creating said second image by wrapping each identified HR data entry onto its associated triangle within said triangularized first image; and (E) an output for outputting said second image.

17. The super resolution computing device of claim 16, wherein:
each of said LR images is a low resolution rendition of a corresponding one of said HR images, wherein each LR image and its corresponding HR image constitute an image pair; and
each of said LR images and HR images are triangularized with a common, triangularized model mesh defined by:
aligning all of said HR images;
creating a mean image from all the aligned HR images; and
triangularizing said mean image;
wherein the triangularized mean image is defined as said common, triangularized model mesh.

18. The super resolution computing device of claim 17, wherein:
said one-to-one correlation between each LR data entry and its corresponding HR data is based on the correlation between each LR data entry and its corresponding triangle in said triangularized model mesh and between the correlation between said corresponding triangle in said triangularized model mesh and its corresponding HR data entry, and based on the correspondence between each LR image and HR image in an image pair; and
said first image is triangularizing using said common, triangularized model mesh.

19. The super resolution computing device of claim 18, wherein:
said high resolution (HR) dictionary of triangularized high resolution (HR) images is defined by:
(a) wrapping each HR image onto said common, triangularized model mesh; and
(b) for each wrapped HR image, collecting the pixel information of each triangle on the triangularized model mesh into said HR dictionary, each collection of pixel information of each triangle corresponding to each wrapped HR image being a separate group of pixel data, and each separate group of pixel data being a separate one of said HR data entries associated with its corresponding triangle; and
said low resolution (LR) dictionary of triangularized low resolution (LR) images is defined by:
(1) wrapping each LR image onto said common, triangularized model mesh;
(2) for each wrapped LR image, collecting the pixel information of each triangle on the triangularized model mesh into said LR dictionary, each collection of pixel information of each triangle corresponding to each wrapped LR image being a separate group of pixel data, and each separate group of pixel data being a separate one of said LR data entries associated with its corresponding triangle.

20. The super resolution computing device of claim 17, wherein:
   said input image, output image, HR images, an LR images are each images of human faces; and
   all of said HR images are aligned in the construction of said mean image according to pre-specified landmarks including at least one of eyes, nostrils, or mouth.

* * * * *